United States Patent Office 2,765,320
Patented Oct. 2, 1956

2,765,320

PREPARATION OF 2,3-DIMETHYLINDOLE

Alfred R. Bader, Milwaukee, Wis., and John E. Hyre, Cambridge, Mass., assignors to Pittsburgh Plate Glass Company No Drawing. Application September 3, 1954,
Serial No. 454,230

3 Claims. (Cl. 260—319)

This invention relates to a novel and economical method for preparing 2,3-dimethylindole, and pertains more particularly to its preparation by heating N-butenylaniline with polyphosphoric acid.

The indoles, that is, the compounds containing the moiety

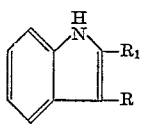

are valuable compounds for use in the preparation of perfumes, of the amino acid tryptophan, and in the preparation of plant hormones such as indole-3-acetic acid.

The indoles have heretofore been prepared primarily by the Fischer indole synthesis which involves the zinc chloride catalyzed cyclization of phenylhydrazones. The phenylhydrazones, however, are expensive compounds; consequently, the indoles have been high priced chemicals, with the result that their use has been somewhat limited.

It has now been discovered that a particularly useful indole, namely 2,3-dimethylindole, which possesses the structure

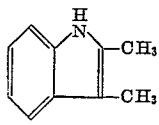

can be prepared readily, inexpensively and in good yields by heating N-butenylaniline with polyphosphoric acid. The reaction may be depicted structurally as follows:

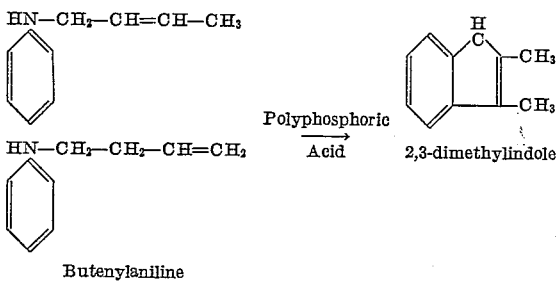

In addition to the 2,3-dimethylindole, two other unidentified products are also obtained when the reaction depicted above is carried out.

The starting material, N-butenylaniline, is readily obtained by the reaction of aniline with butadiene-1,3, for example, as described in U. S. Patent 2,495,890, and as shown in the specific examples set forth hereinbelow.

The polyphosphoric acid may be regarded as comprising a reaction product of or a solution of ortho-phosphoric acid ($H_3PO_4$) and phosphorus pentoxide ($P_2O_5$). This acid is termed "a condensed phosphoric acid" and its formula is believed to be:

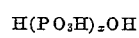

or

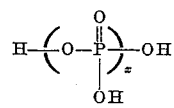

wherein $x$ is greater than one. Polyphosphoric acid is an easily handled and relatively inexpensive viscous liquid. It is understood to contain about 82 percent to 85 percent phosphorus pentoxide.

The preparation of 2,3-dimethylindole by the method of this invention is exceedingly simple. For example, the reaction is carried out simply by admixing the N-butenylaniline and the polyphosphoric acid, heating the resulting mixture, preferably at reflux temperature, cooling and neutralizing the reaction mixture, and then distilling the product to yield crystalline 2,3-dimethylindole.

The ratio of N-butenylaniline to polyphosphoric acid is not critical, and may be varied widely without substantially affecting the yield of the desired 2,3-dimethylindole. Preferably, however, a mixture is utilized which contains about 2 parts by weight of N-butenylaniline to 1 part of polyphosphoric acid, but ratios as high as 15 parts of N-butenylaniline to 1 part of polyphosphoric acid, and as low or lower than 1 part of N-butenylaniline to 2 parts of polyphosphoric acid yield substantial amounts of 2,3-dimethylindole.

As pointed out hereinabove, the reaction is preferably carried out at reflux temperatures, which ordinarily range from about 200° C. to 250° C., but other temperatures, from about 100° C. to 300° C. can also be utilized to give substantial yields of 2,3-dimethylindole. The reaction is generally carried out at atmospheric pressures, but this is not a critical expedient, as the reaction also proceeds satisfactorily when super-atmospheric pressures, or sub-atmospheric pressures are utilized.

Inasmuch as the reaction proceeds readily whenever the N-butenylaniline and polyphosphoric acid are brought into effective contact with one another, no solvent or diluent is necessary; however, if desired the reaction can be carried out in the presence of an inert solvent or diluent, that is, a material which does not react substantially with either the N-butenylaniline, the polyphosphoric acid or the reaction products. Generally the reaction is substantially complete in a period of 2 to 8 hours, especially when the reaction is carried out at reflux temperatures, although it has been found that some 2,3-dimethylindole can be isolated from the reaction mixture even after the N-butenylaniline and polyphosphoric acid have been in contact for only a few minutes. Reaction times much longer than 8 hours can also be utilized, although no particular economic advantage is obtained.

The preparation of N-butenylaniline, and the preparation of 2,3-dimethylindole by the reaction of N-butenylaniline with polyphosphoric acid are illustrated in the following examples. The examples are not intended to limit the invention, however, for there are obviously many possible variations and modifications.

*Example I*

A mixture of 465 grams of aniline, 325 grams of butadiene and 20 grams of sodium was heated in a rocking bomb for 18 hours at 120° C. The mixture was cooled, methanol was added to decompose the unreacted sodium, and the product dissolved in ether was washed with water, stripped and distilled to yield N-butenylaniline, B. P. 108–120 at 11 mm., $n_D{}^{25°}$ 1.555.

Example II

A mixture of 100 grams of N-butenylaniline and 50 grams of polyphosphoric acid was refluxed for 7 hours. The reaction mixture was then cooled, hydrolyzed with aqueous alkali (sodium hydroxide), extracted with ether and the extracted material distilled to give 32 grams of high purity 2,3-dimethylindole, boiling at 150° C. to 165° C. at 12 mm., and melting at 103° C.–104° C.

When Example II is repeated utilizing other reaction temperatures, for example, in the range of about 100° C. to 300° C., 2,3-dimethylindole is again obtained in good yields.

2,3-dimethylindole has an odor, and consequently finds use in the manufacture of perfumes and similar materials. It is also useful as an intermediate in the preparation of other organic chemicals, including amino acids and carboxylic acid derivatives useful as plant hormones.

From the foregoing description it will be apparent that the method of the present invention constitutes a new and useful process for preparing 2,3-dimethylindole. It will also be apparent to those skilled in the art that numerous variations and modifications may be made in the procedure described herein without departing from the spirit and scope of the invention as defined in the appended claims.

We claim:
1. A method for preparing 2,3-dimethylindole which comprises heating a mixture of N-butenylaniline and polyphosphoric acid at a temperature of from about 100° C. to about 300° C.
2. A method for preparing 2,3-dimethylindole which comprises admixing N-butenylaniline and polyphosphoric acid, refluxing the resulting mixture, hydrolyzing the reaction mixture with aqueous alkali, extracting the hydrolyzed mixture with ether and distilling the extracted material.
3. A method for preparing 2,3-dimethylindole which comprises heating at a temperature of from about 100° C. to 300° C. a mixture of N-butenyl aniline and polyphosphoric acid in an amount such that there is present from 0.5 to 15 parts by weight of N-butenyl aniline for each part of polyphosphoric acid.

References Cited in the file of this patent

Hickenbottom, W. J.: "Reactions of Unsaturated Compounds, Part III, Addition of Arylamines to Butadiene," Jour. of the Chem. Soc., 1934, pp. 1981–84.